US006997717B2

(12) United States Patent
Kienzle et al.

(10) Patent No.: US 6,997,717 B2
(45) Date of Patent: Feb. 14, 2006

(54) METHOD AND SYSTEM FOR POINT OF NEED CONTINUING EDUCATION DELIVERY

(75) Inventors: Michael G. Kienzle, Iowa City, IA (US); Dawn R. Ainger, Hiawatha, IA (US)

(73) Assignee: University of Iowa Research Foundation, Iowa City, IA (US)

(*) Notice: Subject to any disclaimer, the term of this patent is extended or adjusted under 35 U.S.C. 154(b) by 114 days.

(21) Appl. No.: 10/102,334

(22) Filed: Mar. 20, 2002

(65) Prior Publication Data

US 2003/0180694 A1 Sep. 25, 2003

(51) Int. Cl.
*G09B 23/28* (2006.01)

(52) U.S. Cl. .................. 434/262; 434/362; 434/219
(58) Field of Classification Search ......... 434/262–275, 434/219, 350, 362
See application file for complete search history.

(56) References Cited

U.S. PATENT DOCUMENTS

| | | | |
|---|---|---|---|
| 5,791,908 A | * | 8/1998 | Gillio .................. 434/262 |
| 6,206,829 B1 | | 3/2001 | Iliff |
| 6,234,964 B1 | | 5/2001 | Iliff |
| 6,256,613 B1 | * | 7/2001 | Falchuk et al. ............ 705/2 |
| 6,283,761 B1 | | 9/2001 | Joao |
| 6,287,254 B1 | | 9/2001 | Dodds |
| 6,539,269 B1 | * | 3/2003 | Jarrow et al. ............ 700/83 |
| 6,546,230 B1 | * | 4/2003 | Allison .................. 434/350 |
| 6,551,107 B1 | * | 4/2003 | Buckley et al. ........... 434/262 |
| 2001/0012913 A1 | | 8/2001 | Iliff |
| 2001/0053513 A1 | * | 12/2001 | Corn et al. .............. 434/350 |
| 2002/0069086 A1 | * | 6/2002 | Fracek et al. .............. 705/2 |
| 2002/0110795 A1 | * | 8/2002 | Lemchen ................ 434/350 |
| 2002/0169638 A1 | * | 11/2002 | Rodriguez-Cue ........... 705/3 |
| 2003/0061070 A1 | * | 3/2003 | Kelly et al. ............... 705/2 |
| 2003/0074559 A1 | * | 4/2003 | Riggs .................... 713/168 |
| 2003/0110215 A1 | * | 6/2003 | Joao ..................... 709/203 |
| 2003/0144877 A1 | * | 7/2003 | Goldmann et al. .......... 705/2 |

OTHER PUBLICATIONS

Compendium of Health Telematics Projects 94–98, Aug. 1998 http://www.ehto.org/ht_projects/html/dynamic/93.html.*
AMT, Advanced Medical Technologies, Thinline Operatory Computer and Total Integrated System, www.amtdental.com/files/amt_brochure.pdf, no publication date.*
Kienzle, Michael G. III. Applications Suite A: Integrating the Electronic Medial Record, Knowledge Resources, and Continuing Medical Education (EMC–CME System), Feb. 15, 2002, pp. 28–74.

* cited by examiner

Primary Examiner—Chanda L. Harris
(74) Attorney, Agent, or Firm—McKee, Voorhees & Sease, P.L.C.

(57) ABSTRACT

The present invention discloses methods and systems for providing education at a point of need. The invention includes creating granules of educational material, associating educational credits with the granules of educational material, receiving a request for at least one of the granules of educational material from the point of need, responding to the request by electronically delivering at least one of the granules of educational material to the point of need, and recording educational credits based on at least one of the granules of educational material delivered to the point of need.

6 Claims, 4 Drawing Sheets

METHOD AND SYSTEM FOR POINT OF NEED CONTINUING EDUCATION DELIVERY

BACKGROUND OF THE INVENTION

The present invention relates to providing knowledge or information at a point and time of need. In particular, but without limitation, the present invention further relates to associating continuing education requirements with the delivery of knowledge or information at the point of need.

Although the present invention is not to be so limited, one particular context to which the present invention can be applied is found in the field of health care. In health care, licensed professionals, including physicians, are required to earn continuing medical education (CME) credits in order to maintain their licensure. The general purpose of such requirements is to provide some level of assurance that health care providers are current in their medical knowledge. Despite CME requirements, problems remain in ensuring that health care providers have access to and use current medical knowledge in their practice.

Some of these problems relate to the delivery method used. In particular, traditional CME delivery methods are inflexible. Traditional CME delivery includes seminars, CD training, and on-line training. None of these delivery methods can consistently assist a health care provider with information during his or her clinical practice daily routine. The content does not have fine enough granularity to allow the health care provider to find and use the information during a clinic visit with a patient. Merely exposing a health care provider to medical knowledge does not really provide any assurance that the health care provider can internalize the information and incorporate it into their every day practice.

A further inflexibility of current CME delivery methods relates to timing. Seminar and conference delivery methods offer health care professionals little or no control as to the timing of the delivery of the information. CD training and on-line training increase the control, but often require large time commitments (i.e. more than one hour) to complete accredited tasks. Health care providers are typically busy professionals who often have difficulties in scheduling the requisite time for continuing medical education.

Despite that health care professionals are generally required to fulfill CME requirements, medical errors still occur. In fact, it is estimated that between 44,000 to 98,000 Americans in hospitals die every year as a result of medical errors. If health care providers were always aware of relevant and important guidelines relative to a particular patient condition, then these medical errors would be reduced.

A further problem with continuing medical education is that generally it is not personalized to a particular health care provider. Therefore a health care provider can receive continuing medical education credits for participation in continuing medical education that is largely irrelevant to the particular health care provider's practice or else can receive continuing medical education credit even though the continuing medical education did not expose the health care provider to anything the health care provider did not already know. Thus, there are significant problems regarding continuing medical education. These problems involve providing the proper information to a health care provider when they need it in order to improve medical care while effectively using the health care providers time.

It has been recognized that computer-based decision-support systems can be used to assist in determining proper diagnosis and selecting appropriate medical procedures. One problem with many such systems is that they are designed to replace clinical judgment as opposed to assisting and improving clinical judgment. Such systems, although directed towards improving patient care, do not necessarily improve a health care provider's medical knowledge. Further, there are concerns that such systems can possibly result in medical errors when the health care provider's judgment is replaced.

Although the above problems have been discussed in the context of continuing medical education of health care providers, in order to improve quality of health care, these same problems are present in other areas where proper or current education is fundamental in improving quality of service. For example, such problems are present in information technology, airline pilots, mechanics, lawyers, and other areas. These are merely a few examples of professions or occupations, where the quality of service is related to the ability to access and use the most current knowledge or information in performing a service. The present invention is not limited to any particular profession, occupation, or type of service. Therefore, a need exists in the art for an improved method and system for delivery of continuing education at the point of need.

A general object, feature or advantage of the present invention is the provision of a method and system for continuing education delivery that improves competency.

A further object, feature or advantage of the present invention is the provision of a method and system for delivering continuing education that presents information at the point of need so that errors can be avoided.

Yet another object, feature or advantage of the present invention is a method and system for point of need continuing education delivery that provides relevant and timely continuing education.

A further object, feature or advantage of the present invention is the provision of a method and system for point of need continuing education delivery that allows for tracking of errors, i.e. knowledge weakness areas.

A still further object, feature or advantage of the present invention is the provision of a method and system for point of need continuing education delivery that breaks down continuing education into manageable granules of information.

Yet another object, feature, or advantage of the present invention is the provision of a method and system for providing continuing education that awards credits for review of manageable granules of information.

A still further object, feature or advantage of the present invention is the provision of a method and system for providing continuing education that provides a follow-up to the point of need delivery of continuing education.

These as well as other features and advantages of the present invention will become apparent from the following specification and claims.

BRIEF SUMMARY OF THE INVENTION

The present invention relates to providing education at a point of need. In particular, though not exclusively, the present invention relates to providing continuing education at the point of need and tracking the amount of continuing education provided.

According to one method of the present invention, educational material is provided at a point of need. The method provides for creating granules of educational material, associating educational credits with the granules of educational material, receiving a request for at least one of the granules of educational material from the point of need, responding to the request by electronically delivering at least one of the granules of educational material to the point of need, and recording educational credits based on the at least one of the granules of educational material delivered to the point of need. Preferably, the granules are small enough that the educational material can be quickly absorbed and immediately applied to improve the quality of service.

This methodology of the present invention can be applied to various contexts. For example, the present invention includes a method for providing continuing medical education to a health care provider at a point and time of need. The method includes creating a set of granules of medical knowledge, associating continuing medical education credits with each of the set of granules of medical knowledge, receiving a request for a granule of medical knowledge from the point of need and at the time of need, responding to the request by electronically delivering a granule of medical knowledge to the point of need and at the time of need, and recording the continuing medical education credits based on the granules of medical knowledge delivered to the point of need.

The present invention further provides for additional information to the health care provider after the time of need. For example, the point in time of need can occur when a health care provider is consulting with a patient or otherwise interacting with a patient. The health care provider can request granules of medical knowledge that are useful for improving the quality of the consultation and thereby reducing or removing the possibility of errors. After the patient consultation, the health care provider can access related and more detailed information to further improve the quality of future patient consultations. The health care provider can receive credit for both the granules of medical knowledge accessed during the patient consultation at the point and time of need as well as the granules of medical knowledge accessed at a later time.

This methodology provides the health care provider with the information that is needed at the time and place that it is needed while still improving the health care provider's knowledge and also allowing the health care provider to receive continuing medical education for the time spent learning.

BRIEF DESCRIPTION OF THE DRAWINGS

The present invention is illustrated by way of example and not limitation in the accompanying drawings, and in which.

DETAILED DESCRIPTION OF THE INVENTION

The present invention will be described as it applies to a preferred embodiment. It is not intended that the present invention be limited to the described embodiment. It is intended the invention cover all modifications and alternatives which may be included within the spirit and broad scope of the invention. In particular, the preferred embodiment described relates to providing continuing medical education over the Internet. The present invention is in no way so limited, as it accompanies the provision of other types of knowledge or information, delivered in other manners as well as other variations.

Figure 1:
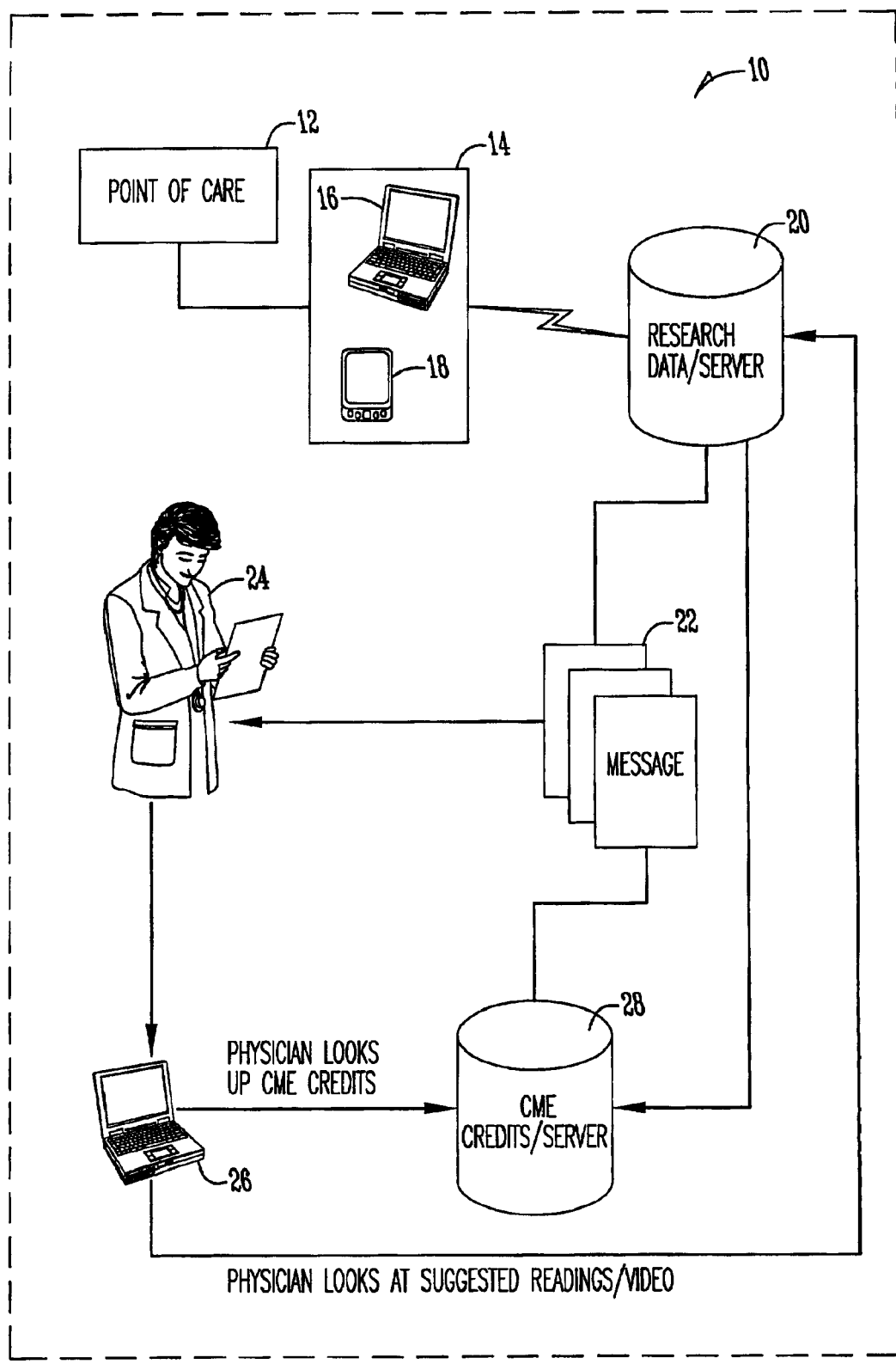
FIG. 1 is a diagram showing one embodiment of the methodology of the present invention.

FIG. 1 illustrates the methodology of a system 10 of the present invention. A point of care 12 is shown. The point of care 12 is a point of need. The point and time of care can occur at the location of and during a patient consultation or other interaction between a health care provider and a patient. The health care provider is presented with a situation where additional information could benefit the quality of care given to a patient. The health care provider accesses a computer 14 at the point of care. The computer 14 can be a notebook computer 16, a handheld computer or personal digital assistant 18, or other computer terminal or device. The computer 14 can be in either a connected or disconnected state to the Internet. When in a connected state, the computer 14 can access research data in a database and/or from a server 20 either locally or over a network such as the Internet. Alternatively, the research data can be accessed locally when the computer 14 is in a disconnected state. When a handheld computer 18 is used and the handheld computer 18 is removed from its cradle and has no other continuity with the server 20, the handheld computer 18 is in the disconnected state.

Once either the research data or server 20 is accessed, the system checks its relevant database and returns any matches for the information requested by the health care provider. The health care provider can then select the proper granule of information required. The health care provider can then use this granule of information in order to improve the patient's care. The amount of information stored within a granule is small and manageable so that it can quickly be reviewed and understood by the health care provider. Preferably, the amount of information contained within a granule that is delivered at the point and time of need is less than the equivalent of one printed page or less than about 500 words or is an otherwise manageable amount of information. For example, the granule delivered at the point and time of need is preferably small enough that it can be reviewed in less than five minutes. The granule need not contain only text and need not contain any text. The granule can include diagrams, charts, sound clips, videos, or other types of media. The present invention also contemplates that a granule can include one or more questions associated with the information in order to quickly test the health care provider's comprehension of the information.

Meanwhile, the system also records the health care provider's access of the data in order to create a record of continuing education credit. If the system is in a connected state, this can occur immediately either via the Internet or to a local server. If the computer 14 is in a disconnected state, the accounting of the continuing education credit can occur later when the health care provider synchronizes the disconnected device, such as a handheld computer 18, to the system. Where the granule includes one or more questions, the health care provider's answers and/or score on these questions can also be recorded.

In addition, a message 22 is sent to the health care provider 24. The message 22 contains suggestions for additional readings, videos, or other training material relating to the same area of the information previously delivered at the point and time of care. The present invention contemplates that these additional granules of information may be larger than those granules of information delivered at the point and time of need. The health care provider 24 can then use a computer 26 to access this suggested material or monitor their accumulation of CME credits. This additional material can also include additional questions to test the health care provider's comprehension. Where questions are associated with the granules of information, the suggested material can be at least partially based on the health care provider's responses to these questions. CME credits are stored in a database or at a server 28. The message 22 sent to the health care provider 24 can also include CME accounting information.

Thus, in this manner, relevant medical knowledge or education is provided at a point in time of need in order to improve the quality of service. At the same time, the individual receiving the educational material also receives credit for their use of the material. In addition, they receive related material so that they can further increase their knowledge or education at a later time. The present invention may also provide for the individual to be tested on the material presented to provide some measure of the individual's comprehension and as verification that the material was indeed reviewed.

Where questions are asked, the present invention provides for the tracking of errors in answering the questions. If an individual consistently is weak in a particular area, then they can receive additional material to be reviewed related to that specific area.

Figure 2:
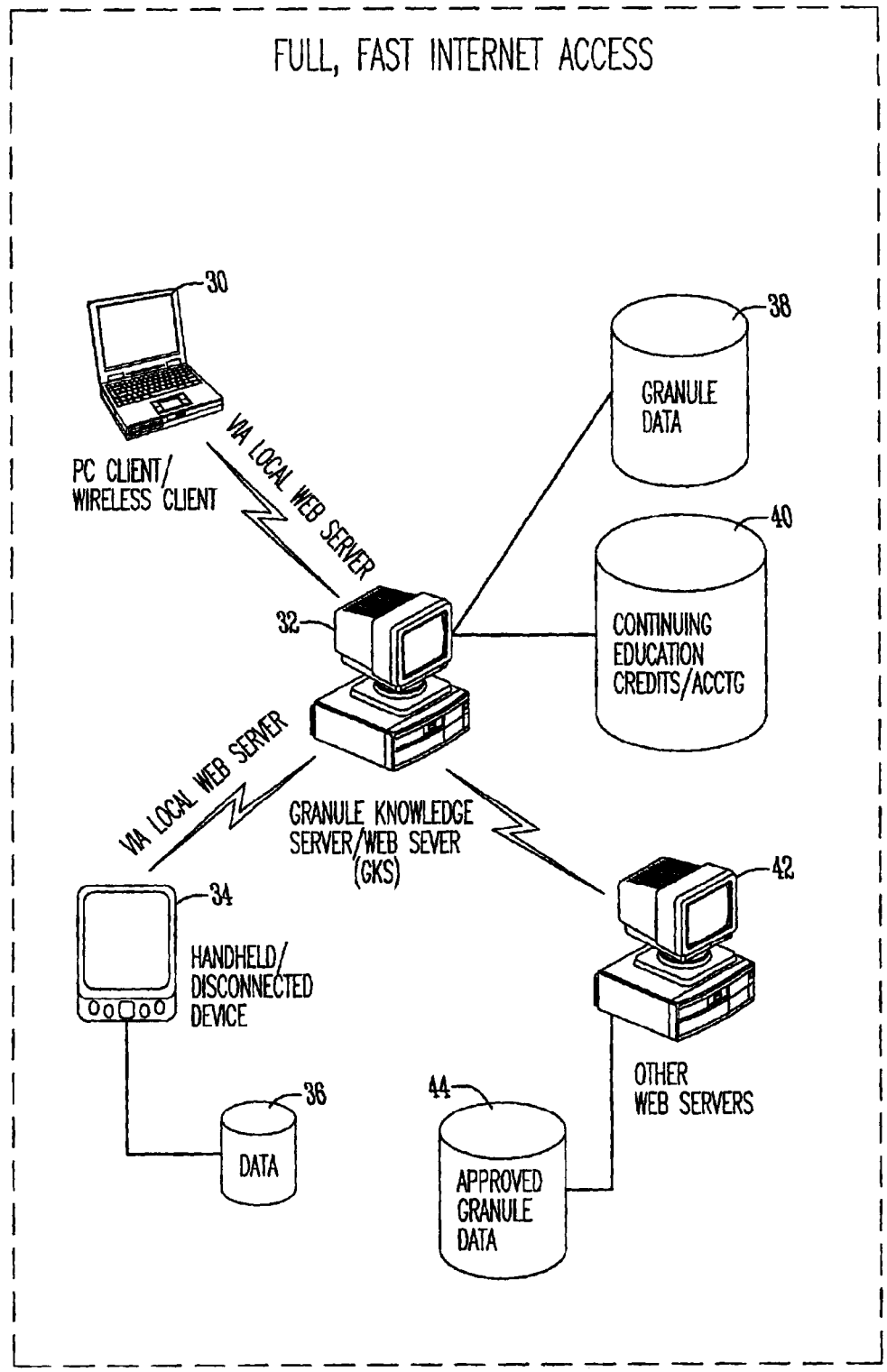
FIG. 2 is a block diagram showing one implementation of a system according to the present invention.
Figure 3:
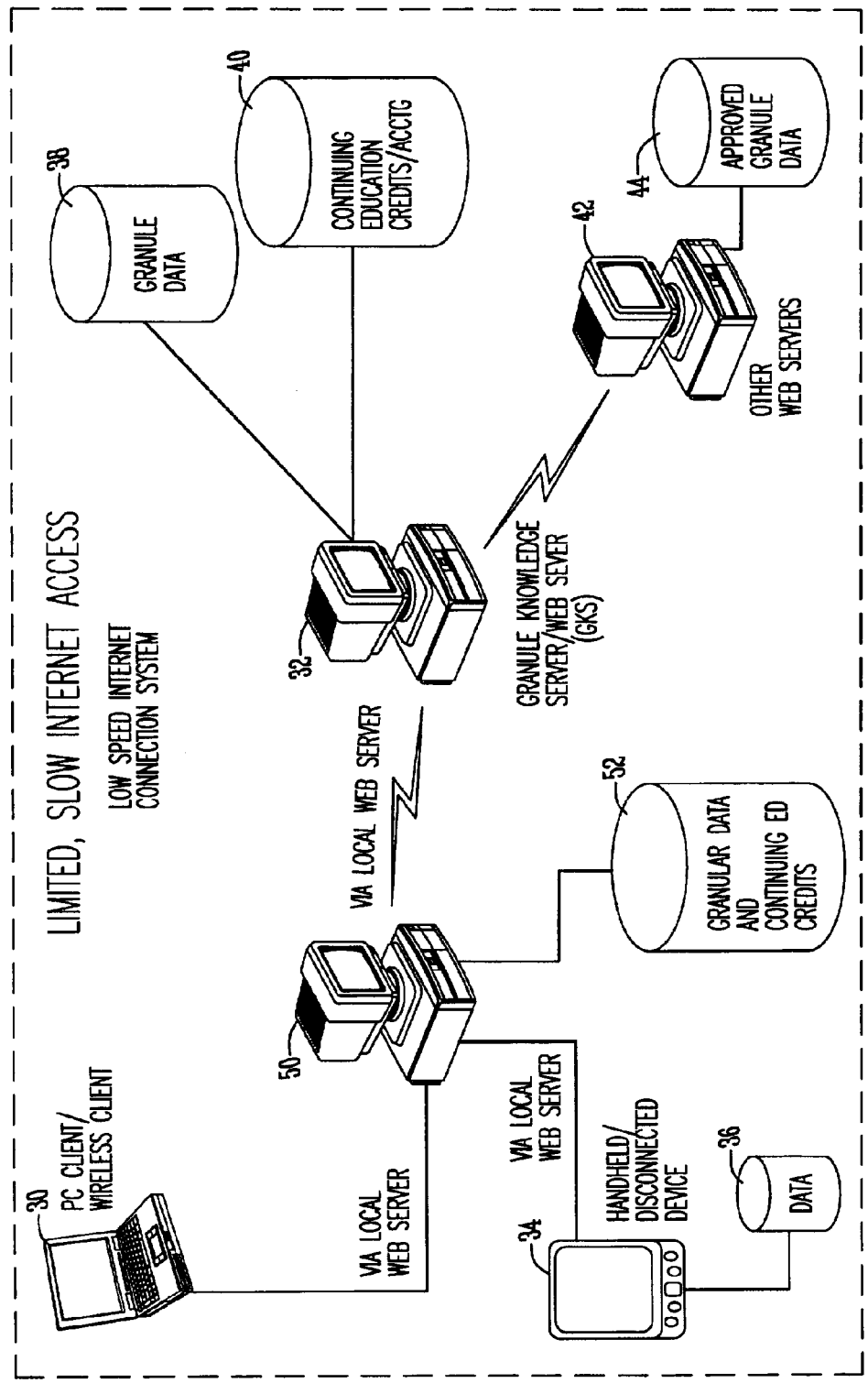
FIG. 3 is a block diagram showing another embodiment of a system according to the present invention, the system adapted for limited, slow internet access.

The present invention is not limited to any particular network topology. In particular, the present invention provides for medical knowledge or research data to be stored either locally or remotely. Similarly, CME data can be stored either locally or remotely. Further the present invention can use the Internet. One advantage of using the Internet is that knowledge or information in the form of granule data can be stored on a remote server that is continuously updated with current knowledge and information. Multiple health care providers can then access the granule data on the remote server without concern for its quality. Such a server could be maintained by a university hospital, government entity, or other trusted source. FIGS. 2 and 3 show variations of the system of the present invention, the variations based on the type of Internet access available.

The present invention contemplates that different users may have different types of Internet access. For example, health care providers in metropolitan areas may have high speed Internet connections while health care providers in rural areas may be limited to low speed Internet connection systems. FIG. 2 illustrates the use of a high speed Internet connection system in accordance with the present invention. In FIG. 2, a professional at the point of need uses an Internet connected device 30 to access a granule knowledge server 32. The granule knowledge server 32 then returns the requested information. Usually this data will be from one of two sources: either data local to the granule knowledge server 32, such as stored in a local granule database 38, or else data from a second site approved for providing granule data, such as a server 42 with approved granule data 44. The granule knowledge server 32 will also record the health care provider's use of the system and account for and store the associated continuing education credits. These continuing education credits can be stored either locally or remotely. For example, these continuing education credits can be stored in database 40.

The present invention also contemplates the health care provider is at the point of need during the time of need and uses a disconnected device such as a handheld computer 34. The handheld computer 34 will access point of need data that is stored locally. This local data 36 may be a subset of data available through the granule knowledge server 32. When the health care provider later synchronizes the disconnected device 34, it will access the granule knowledge server 32 via a network connection to allow the granule knowledge server 32 to account for and store the associated continuing education credits such as stored in database 40.

FIG. 2 assumes that the device 30 and the handheld device 34 are provided with Internet access. For example, such Internet access can be through a local access server (not shown).

Thus, when the health care provider is not at the point of need, the health care provider can use either a connected device 30 or a disconnected device 34 to access data. Generally, however, the health care provider would choose to use the connected device 30 to access larger granules of data, in particular those granules of data that are provided in a follow-up message as opposed to those provided at the point and time of care.

FIG. 3 shows another embodiment of the present invention where the health care provider has limited, slow Internet access. In FIG. 3, a local granule knowledge server assistant 50 is used. The local granule knowledge server assistant 50 is connected to a granular data and continuing education credits database 52. According to FIG. 3, the Internet connected device 30 or a disconnected device 34 communicate with the local granular knowledge server assistant 50. The local granular knowledge server assistant 50 then provides the granular data and records the continuing education credits locally. Periodically, the local granular knowledge server assistant 50 can communicate with the granular knowledge server 32 in order to synchronize both the granular data and the continuing education credits. Because the information is stored locally, local granular knowledge can be quickly provided at the point of need and at the time of need even when a limited band width, slow Internet access is all that is available.

Figure 4:
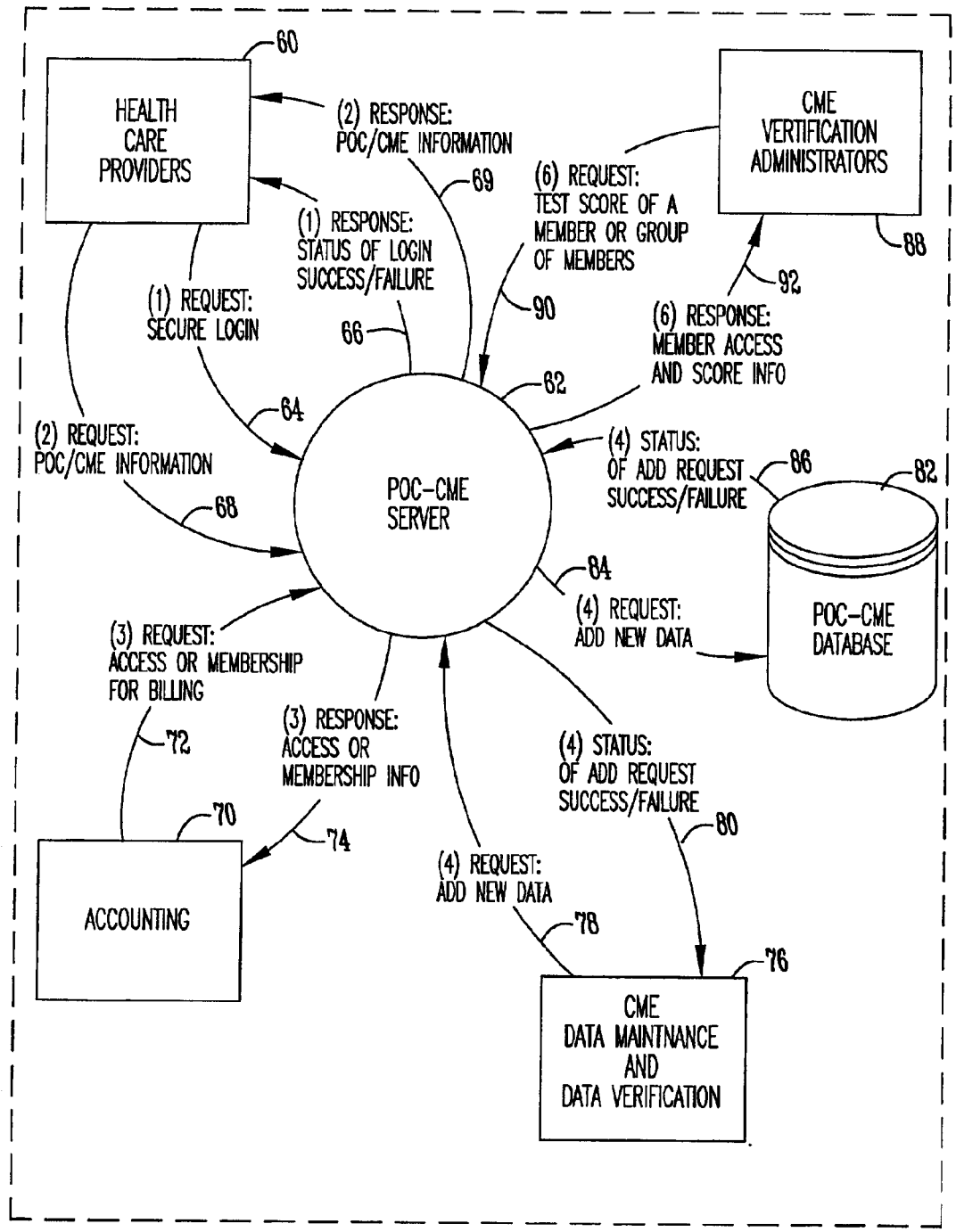
FIG. 4 provides a point of care work context diagram according to one embodiment of the present invention.

FIG. 4 provides a point of care CME system work context diagram. As shown in FIG. 4, a health care provider 60 communicates with the point of care continuing medical education server 62. Further the invention provides that the health care provider 60 may be required to first make a login request 64 to the server 62. The server 62 then provides a response 66. If the response is successful, then a health care provider 60 can make a request 68 for point of care granules of information or CME information. The server 62 will then appropriately respond with a response 69 providing the point of care or CME information. In addition, the server 62 communicates with an accounting component 70. The accounting component 70 can make a request 72 for access or membership information to the server 62. Server 62 can then respond with the access or membership information 74. Using accounting component 70, health care providers who use the system can be billed for the use of the system. The present invention contemplates that the access to the granular knowledge and/or receipt of CME credits are services that are of value to health care providers. The present invention contemplates that these services may be sold on a subscription basis, transaction basis, or according to other business models.

In addition, the server 62 communicates with a CME data maintenance and data verification component 76. The maintenance and verification component 76 can make a request to add new data to the server 62 and is provided with a status 80 of this request from the server 62.

A point of care—CME database 82 is properly connected to the server 62 so that the server 62 can make a request 84 to add new data to the database 82 and that database 82 component can respond with the status 86 of that request. This allows the database 82 to be updated as needed with current granules of knowledge or CME information. Further, the present invention contemplates that there may be a CME verification administration component 88 in order to ensure that only properly earned credit is given. The CME verification administration component 88 can make a request 90 to the server 62 for the test score of a member or group of members and the corresponding response 92 is given to the CME verification and administration component 88.

Thus, a method for providing education at a point of need has been disclosed. The present invention contemplates numerous variations in the type of information used, the topology of a network used to deliver the information, the type of device used to access the information, and other variations within the spirit and scope of the invention.

What is claimed is:

1. A method for providing continuing medical education to a medical professional at a point and time of need, comprising:

creating a set of granules of medical knowledge;

associating continuing medical education credits with each of the set of granules of medical knowledge;

receiving a request for at least one of the set of granules of medical knowledge from the medical professional at the point and time of need during a patient encounter;

responding to the request by electronically delivering at least one of the set of granules of medical knowledge to the point and at the time of need, the request associated with services being performed at the point and time of need during the patient encounter;

recording the continuing medical education credits based on the at least one of the set of granules of medical knowledge delivered to the point and at the time of need during the patient encounter;

receiving a request for at least one additional granule of medical knowledge from a set of granules of medical knowledge, the at least one additional granule of medical knowledge related to the at least one granule of medical knowledge; and delivering at least one additional granule of medical knowledge after the patient encounter.

2. The method of claim 1 wherein the at least one additional granule of medical knowledge is larger in size than the at least one granule of medical knowledge.

3. The method of claim 1 further comprising recording the continuing medical education credits based on the at least one additional granule of medical knowledge delivered after the time of need.

4. The method of claim 1 wherein the time of need is the time during which the medical professional requires additional medical knowledge to render proper care to a patient.

5. A computer-assisted method for providing medical knowledge to a health care provider at a point of need and a time of need to improve the quality of care given to a patient, comprising:

participating in an interaction with the patient;

performing an electronic request for a granule of medical knowledge based on the interaction;

receiving an electronic response to the request containing the granule of medical knowledge at the point of need;

providing care to the patient based on the granule of medical knowledge;

documenting continuing medical education credits based on the granule of medical knowledge; and receiving a follow-up message containing a list of related granule of medical knowledge.

6. The method of claim 5 further comprising: accessing at least one related granule medical knowledge; and documenting continuing medical education credits based on the at least one related granules of medical knowledge.

* * * * *